US010686947B2

(12) United States Patent
Aizawa

(10) Patent No.: US 10,686,947 B2
(45) Date of Patent: Jun. 16, 2020

(54) IMAGE FORMING APPARATUS AND PROGRAM FOR INSPECTING QUALITY OF PRINTED IMAGES

(71) Applicant: KONICA MINOLTA, INC., Chiyoda-ku, Tokyo (JP)

(72) Inventor: Hiroaki Aizawa, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/160,641

(22) Filed: Oct. 15, 2018

(65) Prior Publication Data
US 2019/0158683 A1 May 23, 2019

(30) Foreign Application Priority Data
Nov. 17, 2017 (JP) .................................. 2017-221915

(51) Int. Cl.
*H04N 1/56* (2006.01)
*H04N 1/00* (2006.01)

(52) U.S. Cl.
CPC ..... *H04N 1/00087* (2013.01); *H04N 1/00005* (2013.01); *H04N 1/00063* (2013.01)

(58) Field of Classification Search
CPC ........... H04N 1/00087; H04N 1/00005; G03G 2215/0164; G06K 15/1878
USPC .......................... 358/1.9, 2.1, 3.1, 3.27, 518
See application file for complete search history.

(56) References Cited

U.S. PATENT DOCUMENTS

| 6,390,583 B1* | 5/2002 | Kato ................... H04N 1/4015 347/15 |
| 2003/0234960 A1* | 12/2003 | Kaltenbach .............. G06K 5/02 358/3.24 |
| 2006/0193017 A1* | 8/2006 | Zuber ................ H04N 1/00002 358/504 |
| 2011/0222106 A1* | 9/2011 | Grodsky ............ G03G 15/5062 358/1.15 |

FOREIGN PATENT DOCUMENTS

JP     2016180856 A    10/2016

* cited by examiner

*Primary Examiner* — Jamares Q Washington
(74) *Attorney, Agent, or Firm* — Holtz, Holtz & Volek PC

(57) ABSTRACT

An image forming apparatus includes: an image former that forms an image on a sheet on the basis of print image data obtained by performing image processing on raster data subjected to raster image processing; an image reader that reads the image formed on the sheet on the basis of the print image data by the image former to acquire uncorrected read image data; and a hardware processor that compares the raster data with read image data generated from the uncorrected read image data acquired by the image reader to inspect a print state of the image formed on the sheet, wherein the hardware processor, when inspecting the print state of the image formed on the sheet, offsets an amount of adjustment adjusted by the image processing performed on the raster data.

8 Claims, 8 Drawing Sheets

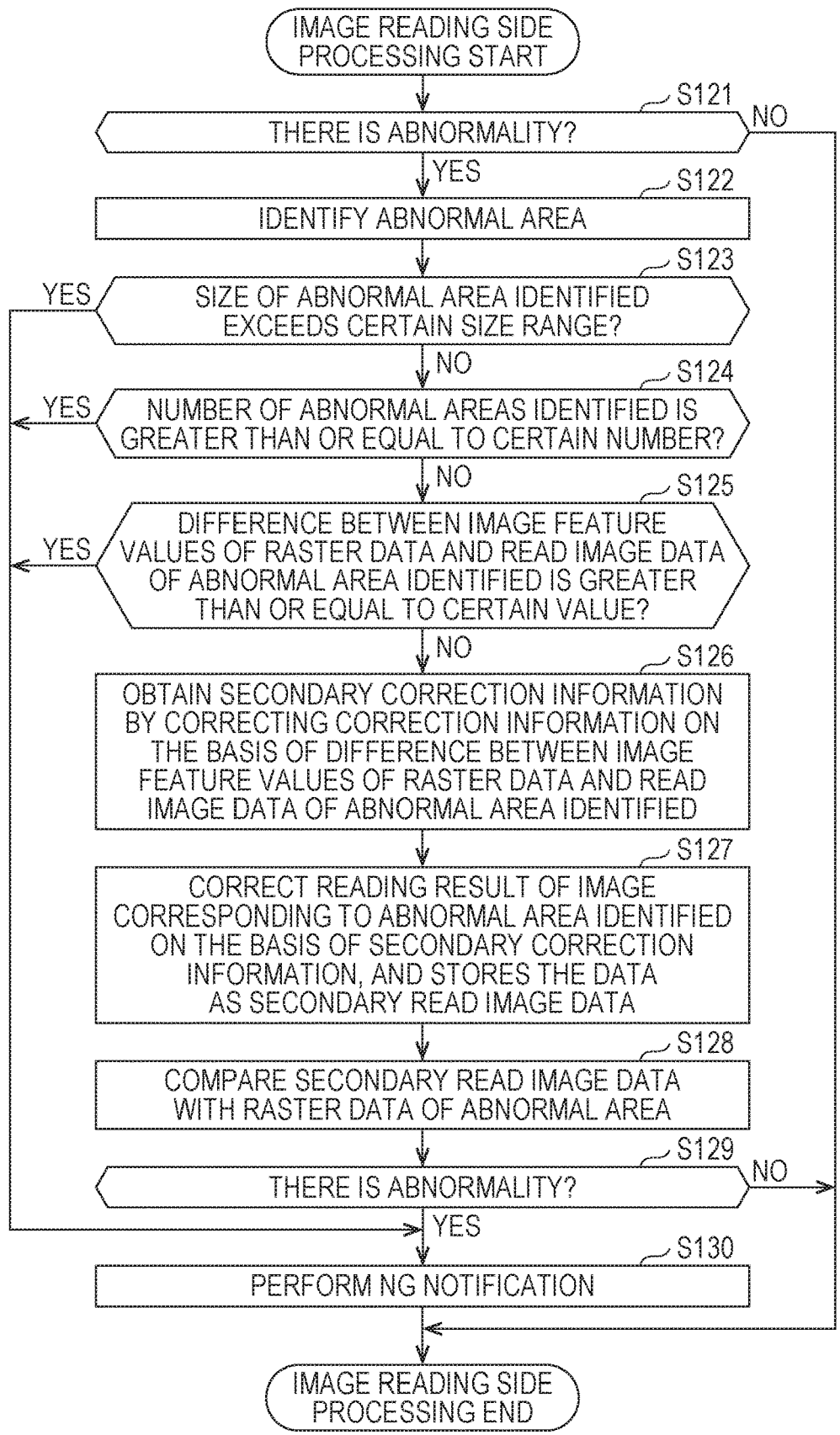

IMAGE FORMING APPARATUS AND PROGRAM FOR INSPECTING QUALITY OF PRINTED IMAGES

The entire disclosure of Japanese patent Application No. 2017-221915, filed on Nov. 17, 2017, is incorporated herein by reference in its entirety.

BACKGROUND

Technological Field

The present disclosure relates to an image forming apparatus and a program.

Description of the Related Art

An image forming apparatus such as a multi-functional peripheral (MFP) or the like forms a toner image on an image carrier such as a photoconductor on the basis of image information in an image former that forms an image by an electrophotographic system, and transfers the toner image formed to a sheet. In such image formation, depending on an operating condition of the image forming apparatus, image quality may change due to change in a state of the image former. Thus, to maintain quality of a printed matter, a technique has been devised that inspects finish of the printed matter by comparing an image input to the image former with a read image that is a reading result of an image formed on a sheet by the image former (for example, see JP 2016-180856 A).

However, in a conventional technique as described in JP 2016-180856 A, the finish of the printed matter is inspected by comparing an original image that is an image alter RIP processing with a read image of the original image formed on the sheet. Thus, when image processing is performed after the RIP processing and then an image is formed on the sheet, the image processing performed after the RIP processing is not reflected in the original image that is a reference image. Therefore, in the conventional technique described in JP 2016-180856 A, there is a possibility that highly reliable image inspection is not performed.

SUMMARY

The present disclosure has been made in view of such a situation, and it is intended to make it possible to perform highly reliable image inspection.

To achieve the abovementioned object, according to an aspect of the present invention, an image forming apparatus reflecting one aspect of the present invention comprises: an image former that forms an image on a sheet on the basis of print image data obtained by performing image processing on raster data subjected to raster image processing; an image reader that reads the image formed on the sheet on the basis of the print image data by the image loaner to acquire uncorrected read image data; and a hardware processor that compares the raster data with read image data generated from the uncorrected read image data acquired by the image reader to inspect a print state of the image formed on the sheet, wherein the hardware processor, when inspecting the print state of the image formed on the sheet, offsets an amount of adjustment adjusted by the image processing performed on the raster data.

BRIEF DESCRIPTION OF THE DRAWINGS

The advantages and features provided by one or more embodiments of the invention will become more frilly understood from the detailed description given hereinbelow and the appended drawings which are given by way of illustration only, and thus are not intended as a definition of the limits of the present invention:

FIG. 8 is a flowchart illustrating an example of secondary determination processing in a fifth embodiment to which the present disclosure is applied.

DETAILED DESCRIPTION OF EMBODIMENTS

Hereinafter, one or more embodiments of the present invention will be described with reference to the drawings. However, the scope of the invention is not limited to the disclosed embodiments.

First Embodiment

Figure 1:
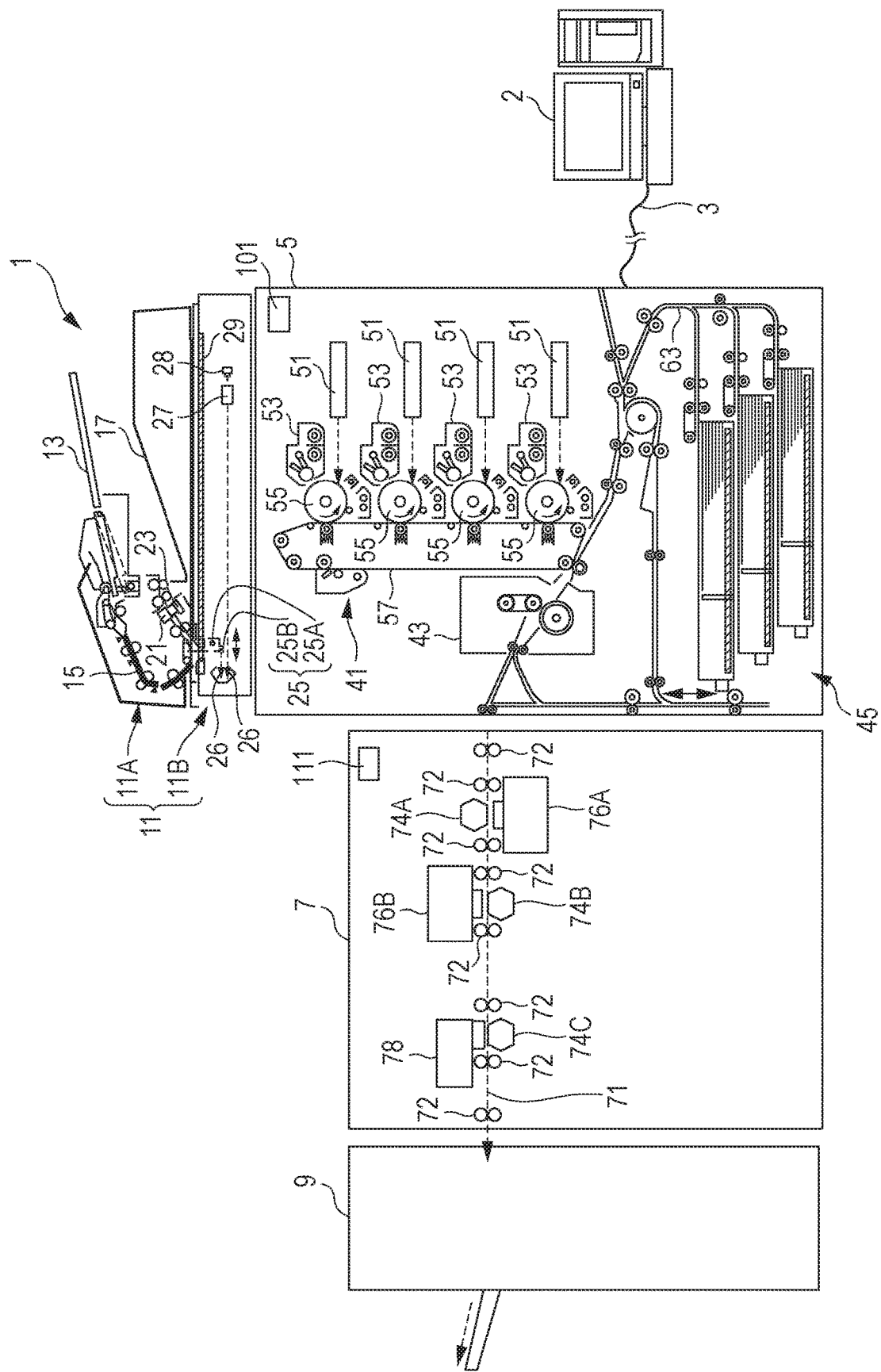
FIG. 1 is a diagram illustrating an overall configuration example of an image forming apparatus in a first embodiment to which the present disclosure is applied.

FIG. 1 is a diagram illustrating an overall configuration example of an image forming apparatus 1 in a first embodiment to which the present disclosure is applied. As illustrated in FIG. 1, the image forming apparatus 1 includes an image forming apparatus main body 5, an image reading apparatus 7, and a post-processing apparatus 9. To the image forming apparatus main body 5, a client PC 2 that is an example of a terminal apparatus is connected via a communication line 3 such as a network. The client PC 2 transmits print data to the image forming apparatus main body 5. The image forming apparatus main body 5 receives the print data transmitted from the client PC 2 via the communication line 3, and performs printing on the basis of the print data received. The post-processing apparatus 9 performs post-processing such as punching on a sheet on which an image is formed. The post-processing apparatus 9 may perform post-processing such as static elimination on the sheet on which the image is formed. A reader 11 is provided on the upper portion of the image forming apparatus main body 5. The reader 11 includes an ADF 11A and a document reader 11B. The ADF 11A includes a document tray 13, a sheet feeding path 15, a sheet ejection tray 17, a contact type image sensor 21, and a density reference member 23. The density reference member 23 is used at the time of shading correction of the ADF 11A. The document reader 11B includes a document illuminating unit 25, a reflection mirror 26, a condenser lens 27, a sensor 28, and a platen glass 29. The reader 11 separates and feeds documents set on the document tray 13 one by one and conveys the documents in the sub scanning direction along the sheet feeding path 15 on which the contact type image sensor 21 is arranged, and ejects the documents to the sheet ejection tray 17. The document illuminating unit 25 includes a lamp 25A and a mirror 25B. While the document is conveyed in the sub scanning direction along the sheet feeding path 15, reading operation on a line basis in the main scanning direction is repeatedly executed by the document illuminating unit 25, the reflection mirror 26, the condenser lens 27, and the sensor 28.

The image forming apparatus main body 5 includes an image former 41, a fixing unit 43, and a sheet feeder 45. The image former 41 includes an exposure apparatus 51, a developing apparatus 53, a photosensitive drum 55, and a transfer belt 57. On the basis of image data of a document read by the reader 11, the image former 41 supplies toners of different colors to the photosensitive drum 55 by the exposure apparatus 51 and performs development. The image former 41 transfers a toner image developed on the photosensitive drum 55 by the transfer belt 57 onto a sheet supplied from the sheet feeder 45. The image former 41 melts the toner of the toner image transferred onto the sheet by the fixing unit 43, whereby a color image is fixed on the sheet. The image reading apparatus 7 is arranged in an inline manner on the downstream side of the image forming apparatus main body 5 and reads an image printed on one side or both sides of the sheet on which the image is formed. Note that, in the following description, it is assumed that the image reading apparatus 7 is arranged in an inline manner, but the image reading apparatus 7 may be arranged in an off-line manner on the downstream side of the image forming apparatus main body 5.

The image reading apparatus 7 includes an image reader 76A, an image reader 76B, a colorimeter 78, background members 74A to 74C, a conveyer 72, and a conveying path 71. The conveying path 71 is a path through which the sheet passes. The conveyer 72 conveys the sheet on which the image is formed. Thus, the sheet is conveyed by driving of the conveyer 72 in the conveying path 71. Upon receiving the sheet supplied from the image forming apparatus main body 5, for example, the image reading apparatus 7 causes the image readers 76A and 76B and the colorimeter 78 to read the image formed on the sheet. A reading result of the image may be output to the image forming apparatus main body 5 or the like. Specifically, each of the image reader 76A and the image reader 76B is arranged at a position facing any one of the front and back sides of the sheet being fed through the conveying path 71. The image reader 76A is arranged at a position to react the back side of the sheet. For example, a reading result of the image reader 76A may be used for checking a shift of the front and back surfaces of the image printed on the sheet, or checking the presence or absence of an unexpected image. On the other hand, the image reader 76B is arranged at a position to read the front side of the sheet. Specifically, the image reader 76B reads the image printed on the sheet. As the sheet is conveyed, the image reader 76B reads the color of the image formed on the sheet in the orthogonal direction orthogonal to the traveling direction of the sheet, that is, in the main scanning direction. Note that, in some cases, the image reader 76A and the image reader 76B are collectively referred to as an image reader 76. The image reader 76 includes, for example, a scanner. In some cases, the background members 74A to 74C are collectively referred to as a background member 74.

The image forming apparatus main body 5 includes a controller 101. The controller 101 includes ROM, RAM, a CPU, an I/O interface, and a storage (not illustrated). The CPU reads a program depending on processing details from the ROM and deploys the program on the RAM, and controls operation of the image forming apparatus main body 5 by cooperating with the program deployed. The storage is implemented by a hard disk drive or a nonvolatile semiconductor memory such as a flash memory, and stores various data. The various data stored in the storage is referenced when the CPU controls the operation of the image forming apparatus main body 5. The controller 101 controls the image former 41, the fixing unit 43, the sheet feeder 45, and the like. The image reading apparatus 7 includes a controller 111. The controller 111 includes ROM, RAM, a CPU, an I/O interface, and a storage (not illustrated). The CPU reads a program depending on processing details from the ROM and deploys the program on the RAM, and controls operation of the image reading apparatus 7 by cooperating with the program deployed. The storage is implemented by a hard disk drive or a nonvolatile semiconductor memory such as a flash memory, and stores various data. The various data stored in the storage is referenced when the CPU controls the operation of the image reading apparatus 7. The controller 111 controls the conveyer 72, the background member 74, the image reader 76, the colorimeter 78, and the like.

Figure 2:
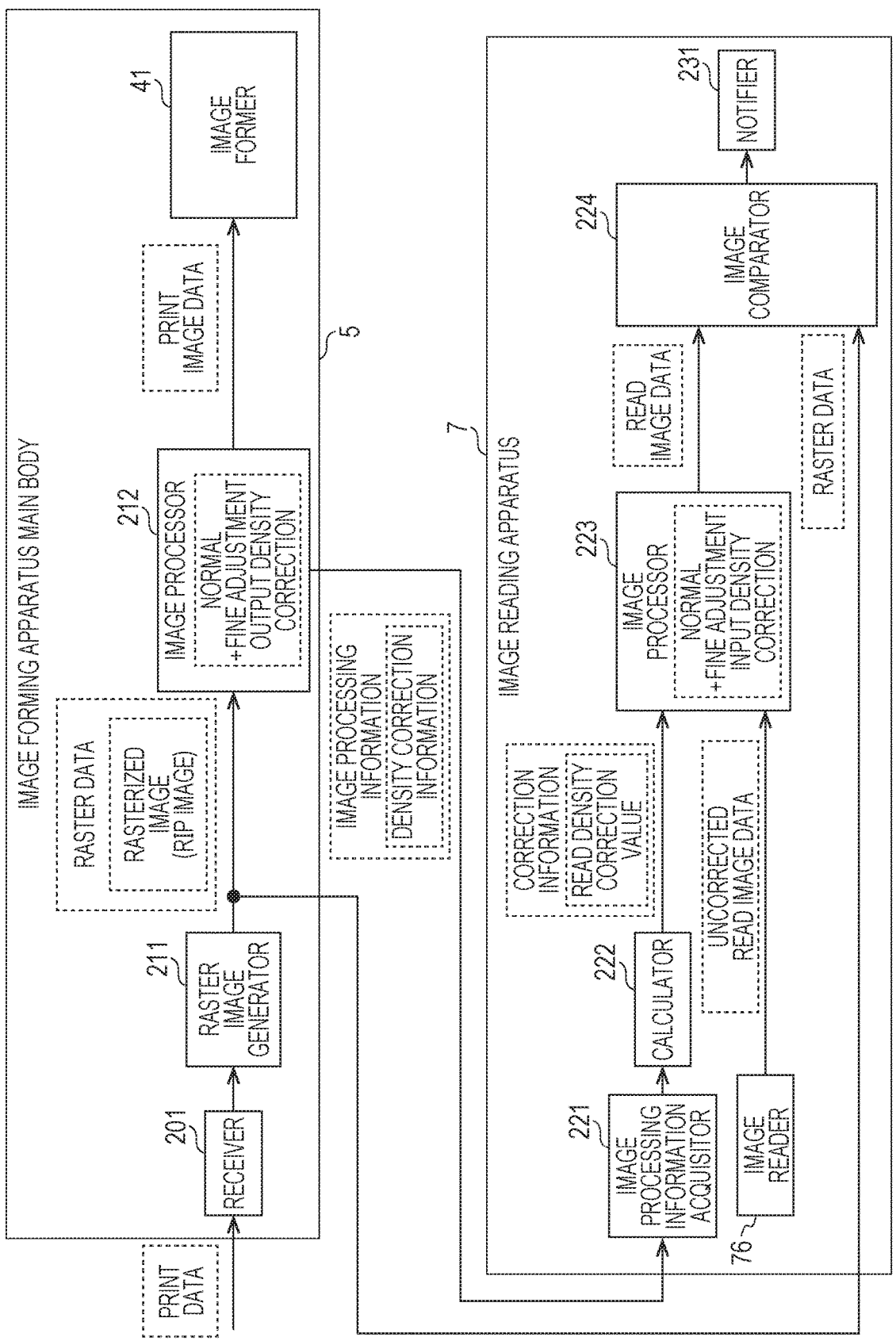
FIG. 2 is a diagram illustrating a flow of various data in the first embodiment to which the present disclosure is applied.

FIG. 2 is a diagram illustrating a flow of various data in the first embodiment to which the present disclosure is applied. Specifically, FIG. 2 illustrates processing of storing the image of the print data received by the image forming apparatus main body 5, and executing density correction processing as an example of image processing for printing, and then executing printing. The image forming apparatus main body 5 includes a receiver 201, a raster image generator 211, an image processor 212, and the image former 41. The raster image generator 211 and the image processor 212 are part of functions implemented by the CPU of the controller 101 executing various programs. The receiver 201 receives print data from the client PC 2 in FIG. 1, and converts the print data into data in a format to be processed in the image forming apparatus main body 5. The print data includes, for example, a print job language (PJL) portion and a subsequent page description language (PDL) portion, as a data structure. The PJL portion is a printing command language for controlling the image forming apparatus main body 5. The PDL portion is a page description language.

The raster image generator 211 performs screen processing, that is, raster image processing for halftoning so that the print data generated by the client PC 2 can be printed in the image forming apparatus main body 5. The raster image processing, that is, the RIP processing, generates raster data. The raster data is data of a rasterized image, and is image data forming a so-called RIP image. The image processor 212 executes processing of further performing image correction on the raster data subjected to the raster image processing from the print data. For example, an output density is corrected by finely adjusting density information included in image data at the normal time. Such correction is performed, for example, in accordance with user's preference. Specifically, for example, it is image processing that reduces only G of RGB data, or brightens and sharpens color. Such image processing is assumed to be executed, for example, when a printed matter, on which an image is formed on a sheet on the basis of print data, is output as a sample and is confirmed, and then the final color is finely adjusted by the image forming apparatus main body 5, for example, by tone curve adjustment. In such an assumption, image processing such as density correction based on an instruction by the image forming apparatus main body 5 is usually executed after the RIP processing, so that if the image read by the image reading apparatus 7 is directly compared with the RIP image as it is, the image is determined as waste.

Thus, as illustrated in FIG. 2, the image reading apparatus 7 includes an image processing information acquisitor 221, a calculator 222, an image processor 223, an image comparator 224, and a notifier 231. The image processing information acquisitor 221, the calculator 222, the image processor 223, and the image comparator 224 are part of functions implemented by the CPU of the controller 111 executing various programs. The image processing information acquisitor 221 acquires, for example, density correction information as image processing information. The density correction information includes fine-adjusted output density correction information. The calculator 222 compares the density correction information that is density information after image processing with density information at the normal time, that is, default density information, and calculates the amount of shift between the default density information and the density correction information that is the density information after the image processing. The calculator 222 obtains a read density correction value as correction information on the basis of the amount of shift obtained. The read density correction value includes a gain or offset value. The read density correction value is data that causes a fine adjustment result in the image forming apparatus main body 5 to be reflected in the uncorrected read image data read by the image reader 76.

For example, a case is assumed where it is obtained, from the density correction information, that the uncorrected read image data is information whose density is shifted by +10 from that at the normal time. In this assumption, it is sufficient that the read density correction value is set to cause the density of the uncorrected read image data to be shifted by −10. That is, the image processor 223 generates read image data on the basis of the read density correction value and the uncorrected read image data. Thus, the read image data has a density close to that of the print data received. The image comparator 224 compares the read image data with the raster data, and determines whether or not there is an abnormality. Specifically, the image comparator 224 determines whether or not there is an abnormality by determining whether or not a difference between each of values of pixels forming the read image data and each of values of pixels funning the raster data is greater than or equal to a preset value; in other words, waste detection is executed. Note that, in the following description, an example will be described of density correction as image processing; however, this is not a limitation, and the correction may be correction by other image processing such as screen processing, or correction processing of a resolution or a brightness value.

Figure 3:
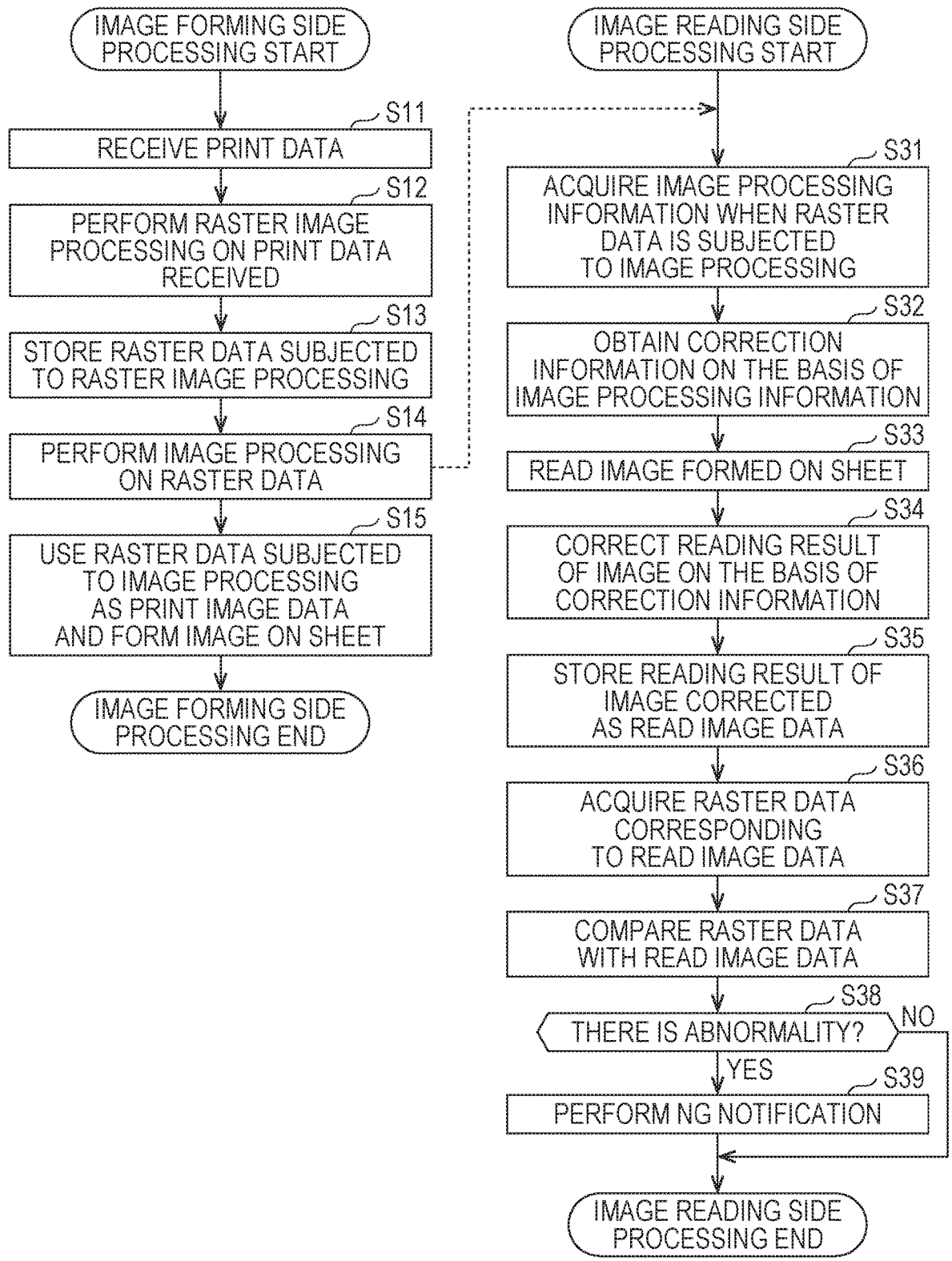
FIG. 3 is a flowchart illustrating various control examples in the first embodiment to which the present disclosure is applied.

FIG. 3 is a flowchart illustrating various control examples in the first embodiment to which the present disclosure is applied. The processing in steps S11 to S15 is executed in the image forming apparatus main body 5. In step S11, the controller 101 receives print data. In step S12, the controller 101 performs the raster image processing on the print data received. In step S13, the controller 101 stores raster data subjected to the raster image processing. In step S14, the controller 101 performs image processing on the raster data. In step S15, the controller 101 uses the raster data subjected to the image processing as print image data, and forms an image on a sheet.

The processing in steps S31 to S39 is executed by the image reading apparatus 7. In step S31, the controller 111 acquires image processing information when the raster data is subjected to the image processing. In step S32, the controller 111 obtains correction information on the basis of the image processing information. In step S33, the controller 111 reads the image formed on the sheet. In step S34, the controller 111 corrects a reading result of the image on the basis of the correction information. In step S35, the controller 111 stores the reading result of the image corrected as read image data. In step S36, the controller 111 acquires the raster data corresponding to the read image data. In step S37, the controller 111 compares the raster data with the read image data. In step S38, the controller 111 determines whether or not there is an abnormality. When it is determined that there is an abnormality (step S38; Y), the controller 111 proceeds to the processing in step S39. When it is determined that there is no abnormality (step S38; N), the controller 111 does not perform NG notification meaning abnormality. When it is determined that there is an abnormality (step S38; Y), the controller 111 proceeds to the processing in step S39, and the controller 111 performs the NG notification meaning abnormality in step S39. Note that, as for the NO notification, it is sufficient that a user or an operator performing maintenance is notified that there is an abnormality, and its notification form is not particularly limited. For example, the controller 111 may notify the controller 101 of that effect, and the effect may be displayed on a display panel (not illustrated) of the image forming apparatus main body 5.

From the above description, in the first embodiment, when inspecting a print state of the image formed on the sheet by comparing the raster data with the read image data, the controller 101 offsets the amount of adjustment adjusted by the image processing performed on the raster data. Accordingly, even if the image formed on the sheet on the basis of the print image data has been subjected to the image processing and the image reader 76 reads the image subjected to the image processing, the amount of adjustment adjusted by the image processing is offset, so that the raster data and the read image data can be compared with each other in a state before the image processing is performed. Therefore, highly reliable image inspection can be performed by appropriate comparison.

In the first embodiment, in the read image data, the amount of adjustment adjusted by the image processing is offset from the uncorrected read image data. Accordingly; even if the uncorrected read image data is data obtained by reading the image subjected to the image processing after the raster image processing, the amount of adjustment adjusted by the image processing is offset in the read image data to be compared with the raster data, whereby the read image data has a density close to that of the print data, so that the waste detection can be accurately performed.

Second Embodiment

Figure 4:
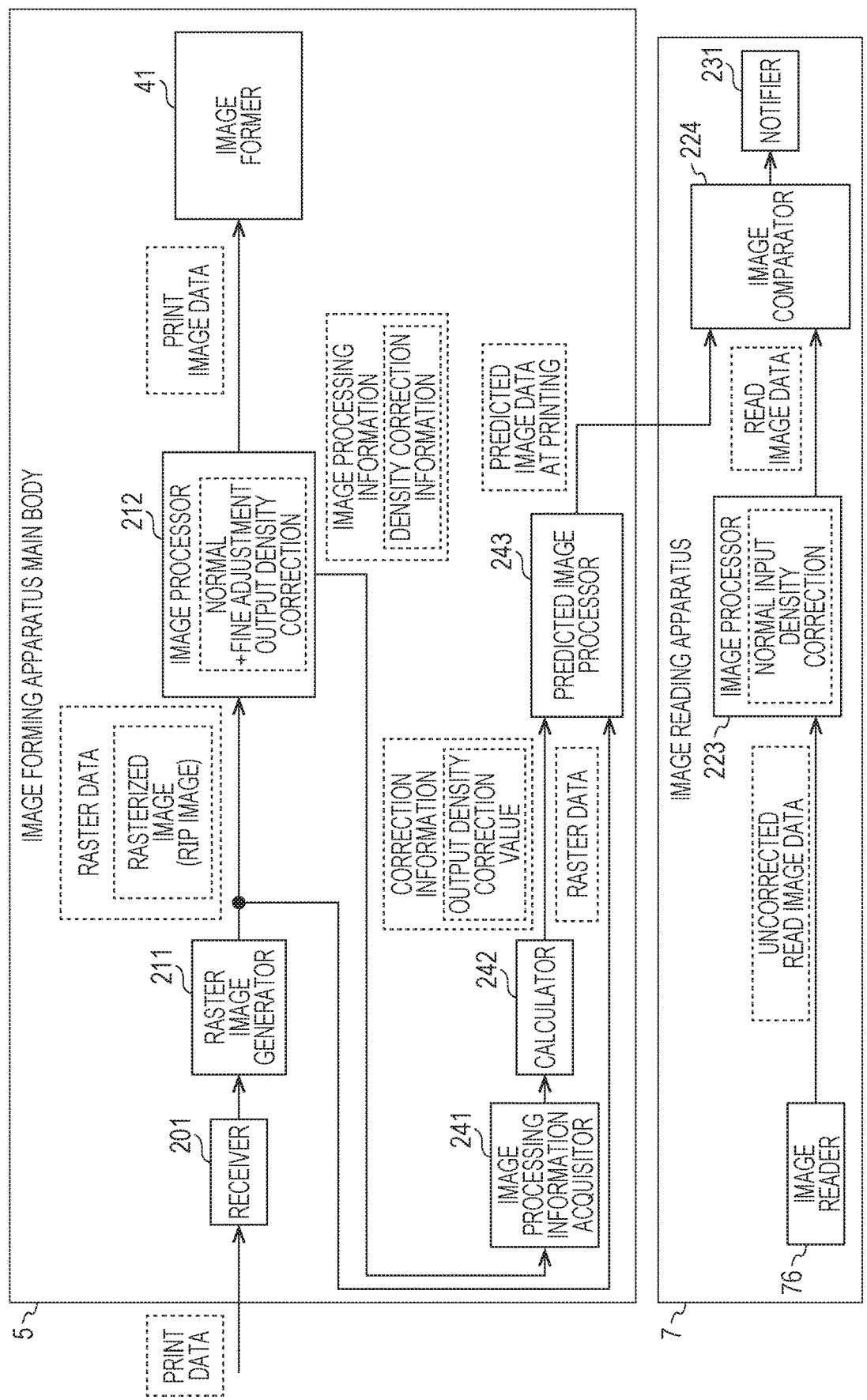
FIG. 4 is a diagram illustrating a flow of various data in a second embodiment to which the present disclosure is applied.

In a second embodiment, descriptions will be omitted of configurations and functions similar to those in the first embodiment. In the second embodiment, the configuration of the image forming apparatus 1 is similar to that in the first embodiment, but part of the flow of data inside the image forming apparatus main body 5 and the image reading apparatus 7 is different from that in the first embodiment. Specifically, the functions of the receiver 201, the raster image generator 211, the image processor 212, and the image former 41 are similar to those in the first embodiment, so that a description thereof will be omitted. In addition, the functions of the image reader 76 and the notifier 231 are similar to those in the first embodiment, and a description thereof will be omitted. FIG. 4 is a diagram illustrating a flow of various data in the second embodiment to which the present disclosure is applied. As illustrated in FIG. 4, in the image forming apparatus main body 5, the functions of an image processing information acquisitor 241, a calculator 242, and a predicted image processor 243 are implemented by the controller 101. The image processing information acquisitor 241 acquires, for example, density correction information as image processing information. The density correction information includes fine-adjusted output density correction information. The calculator 242 compares the density correction information that is density information after image processing with density information at the normal time, that is, default density information, and calculates the amount of shift between the default density information and the density correction information that is the density information after the image processing. The calculator 242 obtains an output density correction value as correction information on the basis of the amount of shift obtained. The output density correction value includes a gain or offset value, and is data that causes a fine adjustment result in the image processor 212 to be reflected in raster data generated by the raster image generator 211.

For example, a case is assumed where it is obtained, from the density correction information, that print image data is information whose density is shifted by +10 from that at the normal time. In this assumption, it is sufficient that the output density correction value is set to cause the density of predicted image data at printing to be shifted by +10. Thus, the predicted image data at printing has a density close to that of the print image data. The image processor 223 generates read image data by performing normal input density correction on uncorrected read image data obtained by reading an image subjected to correction processing. The image comparator 224 compares the predicted image data at printing with the read image data, and determines whether or not there is an abnormality. Specifically; the image comparator 224 determines whether or not there is an abnormality by determining whether or not a difference between each of values of pixels forming the predicted image data at printing and each of values of pixels forming the read image data is greater than or equal to a preset value; in other words, waste detection is executed.

Figure 5:
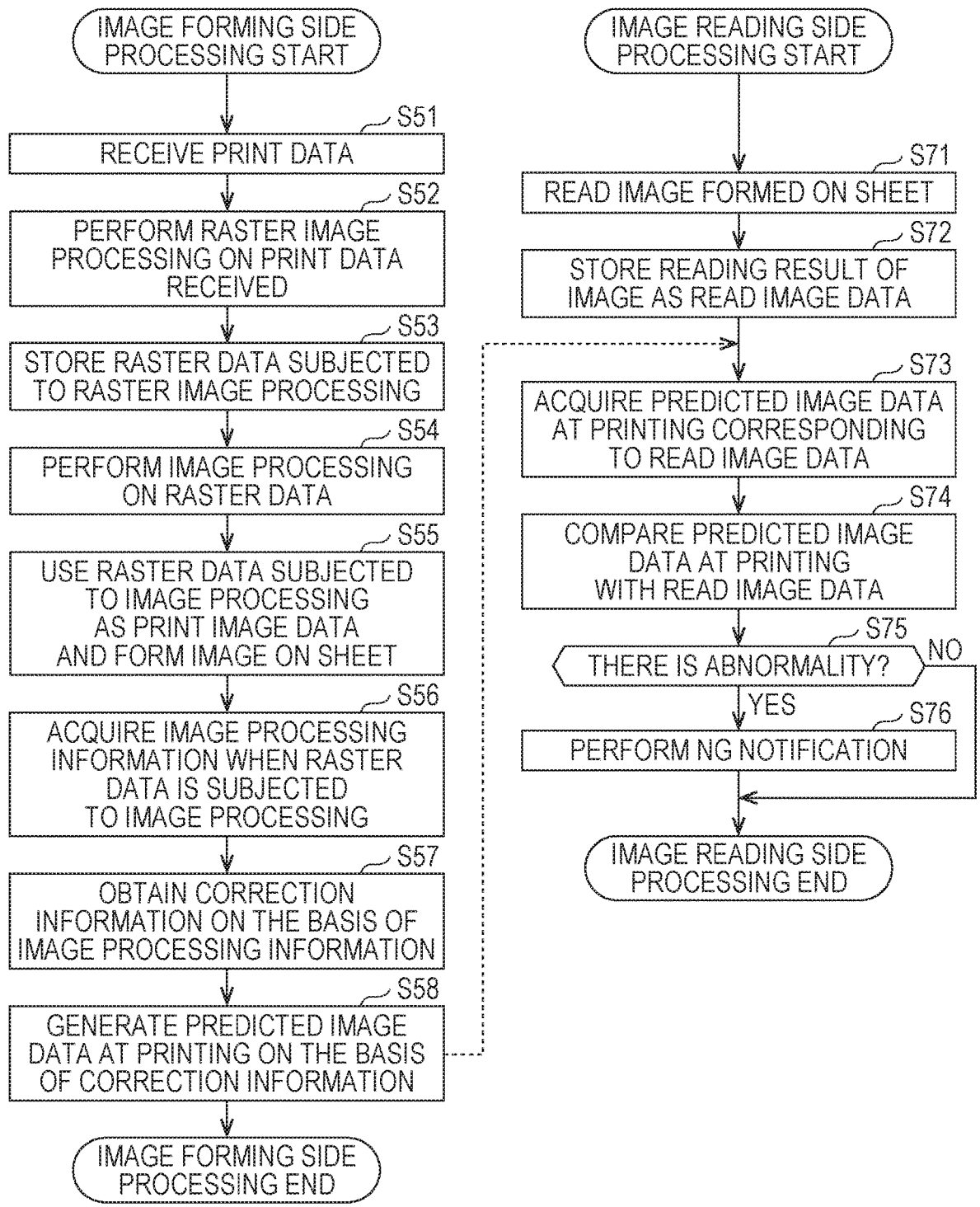
FIG. 5 is a flowchart illustrating various control examples in the second embodiment to which the present disclosure is applied.

FIG. 5 is a flowchart illustrating various control examples in the second embodiment to which the present disclosure is applied. The processing in steps S51 to S55 in FIG. 5 is similar to the processing in steps S11 to S15 in FIG. 1, so that a description thereof will be omitted. The processing in steps S75 and S76 in FIG. 5 is similar to the processing in steps S38 and S39 in FIG. 1, so that a description thereof will be omitted. In step S56, the controller 101 acquires image processing information when the raster data is subjected to the image processing. In step S57, the controller 101 obtains correction information on the basis of the image processing information. In step S58, the controller 101 generates predicted image data at printing on the basis of the correction information. In step S71, the controller 111 reads the image formed on the sheet. In step S72, the controller 111 stores a reading result of the image as read image data. Note that, in step S72, more specifically, uncorrected read image data, which is the reading result of the image, subjected to the normal input density correction is stored as the read image data. In step S73, the controller 111 acquires the predicted image data at printing corresponding to the read image data. In step S74, the controller 111 compares the predicted image data at printing with the read image data.

From the above description, in the second embodiment, the controller 101 compares the read image data with the predicted data at printing obtained by correcting the raster data on the basis of the correction information obtained from the image processing information for adjusting the raster data to the print image data. Accordingly, even if the uncorrected read image data is data obtained by reading the image subjected to the image processing after the raster image processing, the amount of adjustment adjusted by the image processing is reflected in the predicted data at printing to be compared with the read image data generated from the uncorrected read image data. Therefore, the predicted data at printing has a density close to that of the print image data, so that the waste detection can be accurately performed.

Third Embodiment

In a third embodiment, descriptions will be omitted of configurations and functions similar to those in the first and second embodiments. In the third embodiment, the configuration of the image forming apparatus 1 is similar to that in the first and second embodiments. In the third embodiment, a control configuration will be described that performs switching between a case where correction processing is executed on the basis of correction information, on the image reading side, and a case Where correction processing is executed on the basis of correction information, on the image forming side. A setting condition is set including priority order of the processing during inspection of a print state of an image formed on a sheet. When the setting condition gives priority to, for example, speed of detecting waste, correction processing is executed by the image reading apparatus 7. Specifically, on the basis of the correction information, uncorrected read image data that is a reading result of the image is corrected to read image data. When the setting condition gives priority to, for example, quality of detecting waste, correction processing is executed by the image forming apparatus main body 5. Specifically, on the basis of the correction information, predicted image data at printing is generated from raster data.

Figure 6:
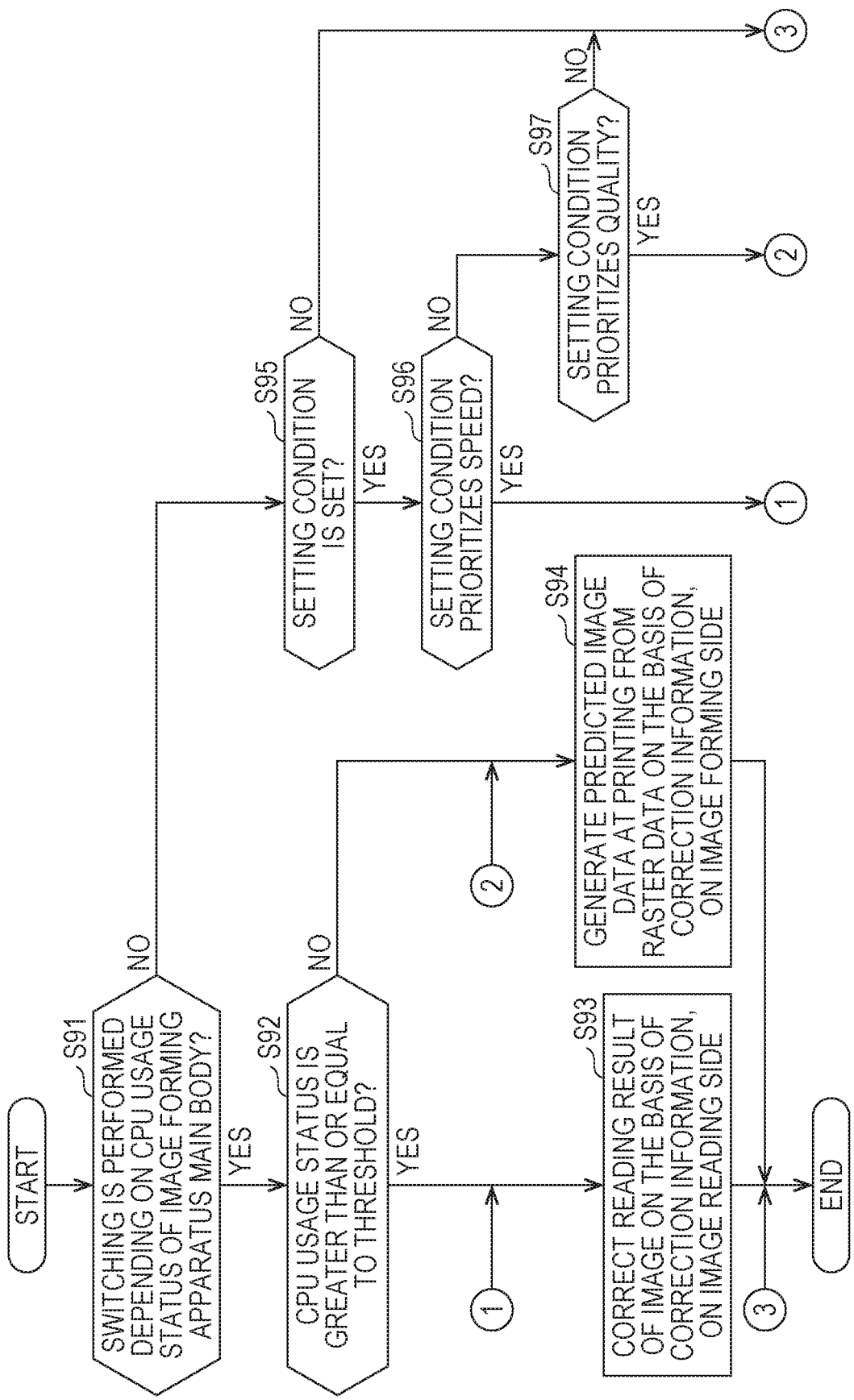
FIG. 6 is a flowchart illustrating an example of switching processing in a third embodiment to which the present disclosure is applied.

Switching may be performed depending on a CPU usage status of the image forming apparatus main body 5. For example, if the CPU usage status is greater than or equal to a threshold, the uncorrected read image data that is the reading result of the image is corrected to the read image data on the basis of the correction information. If the CPU usage status is less than the threshold, the predicted image data at printing is generated from the raster data on the basis of the correction information. The threshold is, for example, 70%. FIG. 6 is a flowchart illustrating an example of switching processing in the third embodiment to which the present disclosure is applied. In step S91, the controller 101 determines whether or not to perform switching depending on the CPU usage status of the image forming apparatus main body 5. When determining to perform switching depending on the CPU usage status of the image forming apparatus main body 5 (step S91; Y), the controller 101 proceeds to the processing in step S92. When determining not to perform switching depending on the CPU usage status of the image forming apparatus main body 5 (step S91; N), the controller 101 proceeds to the processing in step S95. In step S92, the controller 101 determines Whether or not the CPU usage status is greater than or equal to the threshold. When it is determined that the CPU usage status is greater than or equal to the threshold (step S92; Y), the controller 101 proceeds to the processing in step S93. When it is determined that the CPU usage status is less than the threshold (step S92; N), the controller 101 proceeds to the processing in step S94.

In step S93, the controller 111 corrects the reading result of the image on the basis of the correction information, on the image reading side. That is, in step S93, the uncorrected read image data is corrected. In step S94, the controller 101 generates the predicted image data at printing from the raster data on the basis of the correction information, on the image forming side. That is, in step S94, the raster data is corrected. In step S95, the controller 101 determines whether or not the setting condition is set. When it is determined that the setting condition is set (step S95; Y), the controller 101 proceeds to the processing in step S96. When it is determined that the setting condition is not set (step S95; N), the controller 101 ends the processing. In step S96, the controller 101 determines whether or not the setting condition prioritizes the speed. When it is determined that the setting condition prioritizes the speed (step S96; Y), the controller 101 proceeds to the processing in step S93. When it is determined that the setting condition does not prioritize the speed (step S96; N), the controller 101 proceeds to the processing in step S97. In step S97, the controller 101 determines whether or not the setting condition prioritizes the quality. When it is determined that the setting condition prioritizes the quality (step S97; Y), the controller 101 proceeds to the processing in step S94. When it is determined that the setting condition does not prioritize the quality (step S97; N), the controller 101 ends the processing.

From the above description, in the third embodiment, the controller 101 corrects any one of the uncorrected read image data and the raster data depending on the CPU usage status or the setting condition on the basis of the correction information obtained from the image processing information for adjusting the raster data to the print image data. Accordingly, when the switching of control is performed depending on the priority order of the processing included in the setting condition, processing suitable for a user's request can be preferentially executed. In addition, when the switching of control is performed depending on the CPU usage status of the image forming apparatus main body 5, resources can be effectively utilized.

Fourth Embodiment

In a fourth embodiment, descriptions will be omitted of configurations and functions similar to those in the first to third embodiments. In the fourth embodiment, a control configuration will be described for notifying correction information. At the time of outputting at which a print result of print data stored in the image forming apparatus main body 5 is confirmed, it is unnecessary to carry out waste inspection with the image reading apparatus 7, so that no operation is performed for reading an image formed on a sheet by the image reading apparatus 7. When no reading operation is executed by the image reading apparatus 7 as described above, the image reading apparatus 7 is not notified of the correction information on image processing performed by the image forming apparatus main body 5. On the other hand, when the reading operation is executed by the image reading apparatus 7 at the time of executing actual printing, the image reading apparatus 7 is notified of the correction information applied to the printed matter to be read. As a result, the image reading apparatus 7 can perform input correction on the basis of the correction information received, and perform the waste inspection. Note that, notification of the correction information may be executed by transmitting the correction information from the image forming apparatus main body 5 to the image reading apparatus 7; however, this is not a limitation. For example, when the client PC 2 holds the correction information, the image reading apparatus 7 may be notified of the correction information from the client PC 2. This also applies to a case where a server (not illustrated) holds the correction information.

Figure 7:
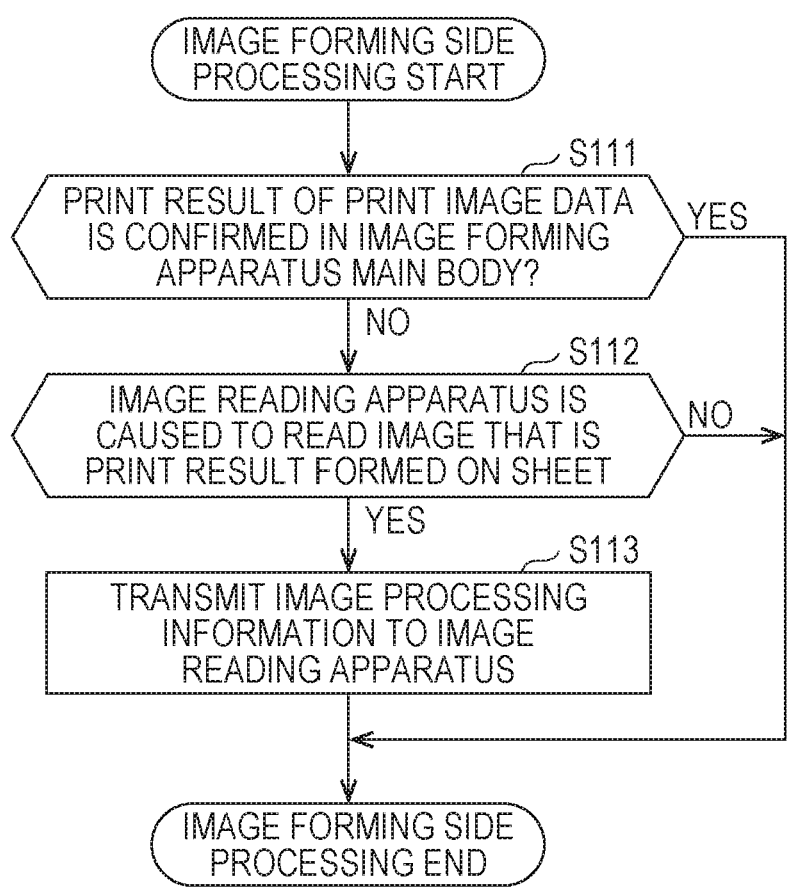
FIG. 7 is a flowchart illustrating an example of correction information notification processing in a fourth embodiment to which the present disclosure is applied.

FIG. 7 is a flowchart illustrating an example of correction information notification processing in the fourth embodiment to which the present disclosure is applied. In step S111, the controller 101 determines whether or not to confirm the print result of the print image data in the image forming apparatus main body 5. When determining to confirm the print result of the print image data in the image forming apparatus main body 5 (step S111: Y), the controller 101 ends the processing. When determining not to confirm the print result of the print image data in the image forming apparatus main body 5 (step S111; N), the controller 101 proceeds to the processing in step S112. In step S112, the controller 101 determines whether or not to cause the image reading apparatus 7 to read the image that is the print result formed on the sheet. When determining to cause the image reading apparatus 7 to read the image that is the print result formed on the sheet (step S112: Y), the controller 101 proceeds to the processing in step S113. When determining not to cause the image reading apparatus 7 to read the image that is the print result formed on the sheet (step S112; N), the controller 101 ends the processing. The controller 101 transmits image processing information to the image reading apparatus 7. That is, when a print state of the image formed on the sheet is inspected, the image processing information is transmitted to the controller 111.

From the above description, in the fourth embodiment, when the print state of the image formed on the sheet is inspected, the image processing information is transmitted to the controller 111. Accordingly, when the image processing information is unnecessary, the image processing information is not transmitted. Therefore, unnecessary communication can be reduced, so that hardware resources of the image forming apparatus 1 can be effectively utilized as a whole, and productivity can be improved.

Fifth Embodiment

In a fifth embodiment, descriptions will be omitted of configurations and functions similar to those in the first to fourth embodiments. In the fifth embodiment, a control configuration will be described for determining again whether or not there is an abnormality after performing correction processing on an abnormal area. In the processing as in the first embodiment, there is a case where uncorrected read image data cannot be appropriately corrected on the basis of correction information, by reading operation by the image reading apparatus 7, although the data is not waste, and as a result, it is determined that there is an abnormality. Thus, in such a case, it is preferable to prevent erroneous determination as the waste by determining whether or not there is an abnormality after performing correction again. That is, processing for determining whether or not there is an abnormality as in the first embodiment is set as primary determination, and when it is determined that there is an abnormality in the primary determination, an area is identified of an abnormal portion in the uncorrected read image data read by the image reading apparatus 7. In the area identified, it is again determined whether or not print data received by the image forming apparatus main body 5 is really abnormal, that is, secondary determination processing is executed. To execute the secondary determination processing, density correction is again performed on the uncorrected read image data with image processing information corresponding to image processing executed in the image forming apparatus main body 5, for example, with a value increased or decreased from the density correction information. Whether the value is increased or decreased may be determined on the basis of a density difference between the area determined as abnormal and the raster data.

For example, when the density of the raster data is greater than the density of the uncorrected image data, if the density correction information corrected in the image forming apparatus main body 5 is, for example, +10, the density correction of, for example, about +2 is performed on the uncorrected read image data. The increment width, which is set to +2, may be determined from the density correction information when corrected in the image forming apparatus main body 5. On the other hand, for example, when the density of the uncorrected read image data is greater than, the density of the raster data, if the density correction information corrected in the image forming apparatus main body 5 is, for example, +10, the density correction of, for example, −2 is performed on the uncorrected read image data. Note that, regarding the increment width, if the density correction information corrected in the image forming apparatus main body 5 is, for example, +100, the increment width may be, for example, +20 when the density correction is performed on any one of the raster data and the uncorrected read image data. As described above, depending on the fluctuation width of the density correction information by the image forming apparatus main body 5, the increment width may be determined to an amount that is within a range of the fluctuation width and able to make a change clear.

Note that, in the following cases, it may be determined that there is an abnormality without executing the secondary determination processing described above. For example, when the size of the area exceeds a certain size range of the abnormal area identified, it may be determined that there is an abnormality. The certain size range is, for example, an area of greater than or equal to ½ or less than 1/10 of the image data to be determined. In addition, when the number of the abnormal areas identified is greater than or equal to a certain number, it may be determined that there is an abnormality. The certain number is, for example, greater than or equal to five. In addition, when a difference between image feature values of the raster data and the read image data of the abnormal area identified is greater than or equal to a certain value, it may be determined that there is an abnormality. The image feature value is, for example, a density, and "greater than or equal to the certain value" is, for example, greater than or equal to 100. Note that, the image feature value may be a resolution, a brightness value, or the like in addition to the density. That is, it is sufficient that the image feature value is any index as long as the difference is clear between the two image data to be compared with each other. In addition, images may be converted into other feature values by mapping, such as Hough transform, and then compared with each other, FIG. 8 is a flowchart illustrating an example of secondary determination processing in the fifth embodiment to which the present disclosure is applied. Note that, the processing in each of steps S123, S124, and S125 is in no particular order and may be executed in parallel. In step S121, the controller 111 determines whether or not there is an abnormality. When it is determined that there is an abnormality (step S121; Y), the controller 111 proceeds to the processing in step S122.

When it is determined that there is no abnormality (step S121; N), the controller 111 ends the processing. In step S122, the controller 111 identifies an abnormal area. For example, when it is determined that a difference between each of values of pixels forming the read image data and each of values of pixels forming the raster data is greater than or equal to a preset value, it is determined that there is an abnormality, so that it is sufficient that an area determined as abnormal is detected by extracting a portion of occurrence of such a pixel in the image, and the abnormal area is identified in the image.

In step S123, the controller 111 determines whether or not the size of the abnormal area identified exceeds the certain size range. When it is determined that the size of the abnormal area identified exceeds the certain size range (step S123; Y), the controller 111 proceeds to the processing in step S130. When it is determined that the size of the abnormal area identified does not exceed the certain size range (step S123; N), the controller 111 proceeds to the processing in step S124. In step S124, the controller 111 determines whether or not the number of the abnormal areas identified is greater than or equal to the certain number. When it is determined that the number of the abnormal areas identified is greater than or equal to the certain number (step S124; Y), the controller 111 proceeds to the processing in step S130. When it is determined that the number of the abnormal areas identified is less than the certain number (step S124; N), the controller 111 proceeds to the processing in step S125. In step S125, the controller 111 determines whether or not the difference between the image feature values of the raster data and the read image data of the abnormal area identified is greater than or equal to the certain value. When it is determined that the difference between the image feature values of the raster data and the read image data of the abnormal area identified is greater than or equal to the certain value (step S125; Y), the controller 111 proceeds to the processing in step S130. When it is determined that the difference between the image feature values of the raster data and the read image data of the abnormal area identified is less than the certain value (step S125; N), the controller 111 proceeds to the processing in step S126.

In step S126, the controller 111 obtains the secondary correction information by correcting the correction information on the basis of the difference between the image feature values of the raster data and the read image data of the abnormal area identified. In step S127, on the basis of the secondary correction information, the controller 111 corrects the uncorrected read image data that is the reading result of the image corresponding to the abnormal area identified, and stores the data as the secondary read image data. In step S128, the controller 111 compares the secondary read image data with the raster data of the abnormal area. In step S129, the controller 111 determines whether or not there is an abnormality. When it is determined that there is an abnormality (step S129; Y), the controller 111 proceeds to the processing in step S130. When it is determined that there is no abnormality (step S129; N), the controller 111 ends the processing. In step S130, the controller 111 performs NG notification and ends the processing.

From the above description, in the fifth embodiment, when determining that there is an abnormality in the print state of the image formed on the sheet, the controller 111 obtains the secondary correction information by correcting the correction information on the basis of the difference between the image feature values of the raster data and the read image data in the abnormal area. Accordingly, it can be confirmed whether or not the abnormal area determined as abnormal is due to a defect in the correction processing. Therefore, erroneous waste detection can be reduced.

In the fifth embodiment, the controller 111 compares the raster data in the abnormal area with the secondary read image data obtained by correcting the read image data on the basis of the secondary correction information. Accordingly, comparison is performed on the data obtained by executing the correction processing based on the secondary correction information on the abnormal area determined as abnormal. Therefore, it is possible to identify whether or not there is an error in the correction information used first.

In the fifth embodiment, the controller 111 determines that there is an abnormality in the print state of the image formed on the sheet when at least one of conditions is satisfied, the conditions being that the size of the abnormal area exceeds the certain size range, that the number of the abnormal areas is greater than or equal to the certain number, and that the difference between the image feature values of the raster data and the read image data in the abnormal area is greater than or equal to the certain value. Accordingly, it is possible to determine Whether or not the abnormal area determined is in a condition not corresponding to the defect of the correction processing. Therefore, by determining that the abnormal area determined is not due to the defect of the correction processing, a waste determination result can be determined as the waste, so that reliability of the waste determination result can be improved.

In the above, the image forming apparatus 1 to which the present disclosure is applied has been described with reference to the embodiments; however, the present disclosure is not limited thereto, and modifications may be made without departing from the spirit of the present disclosure.

For example, in the first embodiment, an example has been described in which the communication line 3 between the image forming apparatus main body 5 and the client PC 2 is wired in FIG. 1; however, the communication line 3 may be wireless. In addition, FIG. 1 illustrates an example of a network configuration including one image forming apparatus main body 5 and one client PC 2; however, this is not a limitation. For example, the network configuration may be a network configuration including a plurality of the image forming apparatus main bodies 5, a network configuration including a plurality of the client PCs 2, and a network configuration including the plurality of image forming apparatus main bodies 5 and the plurality of client PCs 2. In addition, the terminal apparatus is not limited to the client PC 2.

In the first embodiment, an example has been described in which the image forming apparatus 1 includes the image forming apparatus main body 5, the image reading apparatus 7, and the post-processing apparatus 9; however, this is not a limitation. For example, the image forming apparatus 1 may include the image forming apparatus main body 5 and the image reading apparatus 7 without including the post-processing apparatus 9. In addition, the image forming apparatus 1 may include the image forming apparatus main body 5 and the reader 11 without including the post-processing apparatus 9 nor the image reading apparatus 7.

In the first embodiment, an example has been described in which the image reading apparatus 7 includes the image reader 76 and the colorimeter 78; however, this is not a limitation. For example, the image reading apparatus 7 may include the image reader 76 without including the colorimeter 78.

In the first and second embodiments, an example has been described in which the image reader 76 reads an image formed on a sheet; however, this is not a limitation. The reader 11 provided at the upper portion of the image forming apparatus main body 5 may read the image formed on the sheet. In addition, an example has been described in which the controller 101 controls the image forming apparatus main body 5, and the controller 111 controls the image reading apparatus 7; however, this is not a limitation. The controller 101 may control not only the image reading apparatus 7 but also the image forming apparatus main body 5. The controller 111 may control not only the image reading apparatus 7 but also the image forming apparatus main body 5. A server (not illustrated) may remotely control the image forming apparatus main body 5 and the image reading apparatus 7.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus comprising:
    an image former that (i) performs raster image processing on input image data to obtain raster data; (ii) performs further image processing on the raster data based on user settings to obtain print image data; and (iii) forms an image on a sheet based on the print image data;
    an image reader that reads the image formed on the sheet to acquire uncorrected read image data; and
    a hardware processor that corrects one of the raster data and the uncorrected read image data to compare with the other one of the raster data and the uncorrected read image data, so as to inspect a print state of the image formed on the sheet;
    wherein the hardware processor determines whether a setting condition including priority order of processing during inspection of the print state of the image formed on the sheet is set, and
    wherein the hardware processor corrects one of the uncorrected read image data and the raster data depending on a CPU usage status or the setting condition based on correction information obtained from image processing information used in the further image processing for changing the raster data into the print image data.

2. The image forming apparatus according to claim 1, wherein the hardware processor offsets an amount of adjustment performed by the further image processing on the raster data from the uncorrected read image data to obtain corrected read image data.

3. The image forming apparatus according to claim 1, wherein the hardware processor compares the uncorrected read image data with predicted data obtained by correcting the raster data based on correction information obtained from image processing information used in the further image processing for changing the raster data into the print image data.

4. The image forming apparatus according to claim 2, wherein when the print state of the image formed on the sheet is inspected, the image processing information is transmitted to the hardware processor.

5. The image forming apparatus according to claim 2, wherein the hardware processor, when determining that there is an abnormality in the print state of the image formed on the sheet, obtains secondary correction information by correcting the correction information based on a difference between image feature values of the raster data and the read image data in an abnormal area determined.

6. The image forming apparatus according to claim 5, wherein the hardware processor compares the raster data in the abnormal area with secondary read image data obtained by correcting the read image data based on the secondary correction information.

7. The image forming apparatus according to claim 5, wherein the hardware processor determines that there is an abnormality in the print state of the image formed on the sheet when at least one of following conditions is satisfied: size of the abnormal area exceeds a certain size range, a number of the abnormal areas is greater than or equal to a certain number, and the difference between image feature values of the raster data and the read image data in the abnormal area is greater than or equal to a certain value.

8. A non-transitory recording medium storing a computer readable program, wherein the program, when executed by a computer of an image forming apparatus, causes the computer to perform operations comprising:

performing raster processing on input image data to obtain raster data;

performing further image processing on the raster data based on user settings to obtain print image data;

causing the image forming apparatus to form an image on a sheet based on the print image data;

reading the image formed on the sheet to acquire uncorrected read image data; and correcting one of the raster data and the uncorrected read image data to compare with the other one of the raster data and the uncorrected read image data, so as to inspect a print state of the image formed on the sheet;

wherein the computer determines whether a setting condition including priority order of processing during inspection of the print state of the image formed on the sheet is set, and wherein the computer corrects one of the uncorrected read image data and the raster data depending on a CPU usage status of the computer or the setting condition based on correction information obtained from image processing information used in the further image processing for changing the raster data into the print image data.

* * * * *